US009779348B2

(12) United States Patent
Nakatsugawa et al.

(10) Patent No.: US 9,779,348 B2
(45) Date of Patent: Oct. 3, 2017

(54) DATA COMMUNICATIONS SYSTEM, INFORMATION PROCESSING TERMINAL, IC CARD, READER/WRITER, AND PROGRAM

(71) Applicant: FELICA NETWORKS, INC., Tokyo (JP)

(72) Inventors: Yasumasa Nakatsugawa, Kanagawa (JP); Toyokazu Ota, Tokyo (JP)

(73) Assignee: FeliCa Networks, Inc., Tokyo (JP)

( * ) Notice: Subject to any disclaimer, the term of this patent is extended or adjusted under 35 U.S.C. 154(b) by 0 days.

(21) Appl. No.: 14/629,461

(22) Filed: Feb. 23, 2015

(65) Prior Publication Data

US 2015/0170015 A1  Jun. 18, 2015

Related U.S. Application Data

(63) Continuation of application No. 13/012,334, filed on Jan. 24, 2011, now Pat. No. 8,960,531, which is a (Continued)

(30) Foreign Application Priority Data

Jun. 2, 2006 (JP) .................................. 2006-155007

(51) Int. Cl.
*G06F 17/00* (2006.01)
*G06K 19/073* (2006.01)
(Continued)

(52) U.S. Cl.
CPC ....... *G06K 19/073* (2013.01); *G06K 19/0709* (2013.01); *G06K 19/0723* (2013.01);
(Continued)

(58) Field of Classification Search
CPC ...... G06Q 10/02; G06Q 20/10; G06Q 20/223; G06Q 20/26; G06Q 20/32; G06Q 20/322;
(Continued)

(56) References Cited

U.S. PATENT DOCUMENTS 6,411,200 B1 * 6/2002 Kawagishi ........... G06K 7/0008
235/380
6,598,032 B1 * 7/2003 Challener ............ G06Q 20/382
705/64

(Continued)

FOREIGN PATENT DOCUMENTS

CN  1489747  4/2004
JP  3617509  11/2004

OTHER PUBLICATIONS

Notification of the First Office Action from the State Intellectual Property Office of the People's Republic of China mailed Feb. 8, 2014, for counterpart Chinese Patent Application No. 2012-10121054.4, and English translation thereof (24 pages total).

*Primary Examiner* — Thien M Le
(74) *Attorney, Agent, or Firm* — Paratus Law Group, PLLC

(57) ABSTRACT

Disclosed herein is a data communications system configured to execute data communication between three parties of a reader/writer, an integrated circuit card wirelessly communicable with the reader/writer in a non-contact manner, and an information processing terminal connected to the intergraded circuit card via a wired interface, the data communications system including: the reader/writer having a read/write wireless control block; the integrated circuit card having an integrated circuit card wireless control block; and the information processing terminal having a request acceptance block, a data storage block, and a data transmission block.

11 Claims, 11 Drawing Sheets

Related U.S. Application Data continuation of application No. 11/756,506, filed on May 31, 2007, now Pat. No. 7,891,544.

(51) Int. Cl.
  *G06Q 20/32* (2012.01)
  *G06K 19/07* (2006.01)

(52) U.S. Cl.
  CPC ......... *G06Q 20/32* (2013.01); *G06Q 20/3276* (2013.01); *G06Q 20/3278* (2013.01)

(58) Field of Classification Search
  CPC ............. G06Q 20/346; G06Q 20/3674; G06Q 20/3823; G06Q 20/3829; G06Q 30/06; G06Q 20/3278; G06Q 20/3276; G07F 17/266; G07F 7/02; G08G 1/14; H04L 12/585; H04N 19/31; H04N 19/46; H04N 19/61; H04N 19/70; H04N 19/0043; H04N 19/11; H04N 19/142; H04N 19/156; H04N 19/176; H04N 19/187; H04N 19/37; H04N 19/44; H04N 19/50; H04N 19/503; H04N 19/513; G06K 19/073; G06K 19/0709; G06K 19/0723
  USPC .......................... 235/375, 380, 492, 486, 487
  See application file for complete search history.

(56) References Cited

U.S. PATENT DOCUMENTS

| | | | |
|---|---|---|---|
| 7,230,528 B2 | 6/2007 | Kates | |
| 8,360,329 B2* | 1/2013 | Grigg | G06Q 20/227 235/375 |
| 8,577,803 B2* | 11/2013 | Chatterjee | G06Q 20/36 705/41 |
| 8,645,222 B1* | 2/2014 | Tamassia | G06Q 30/0635 705/26.1 |
| 8,676,709 B2* | 3/2014 | Kunz | G06Q 20/105 705/35 |
| 9,240,006 B2* | 1/2016 | White | G06Q 20/204 |
| 2002/0046185 A1* | 4/2002 | Villart | G06Q 20/04 705/64 |
| 2004/0089482 A1* | 5/2004 | Ramsden | G01G 19/005 177/1 |
| 2004/0116074 A1* | 6/2004 | Fujii | G06K 7/0008 455/41.2 |
| 2004/0195324 A1* | 10/2004 | Uchiyama | G01S 13/758 235/451 |
| 2005/0109841 A1* | 5/2005 | Ryan | G06F 13/385 235/380 |
| 2006/0116968 A1* | 6/2006 | Arisawa | G06Q 20/10 705/67 |
| 2006/0234778 A1 | 10/2006 | Matsushita et al. | |
| 2006/0289656 A1* | 12/2006 | Yanagida | G06F 21/52 235/492 |
| 2007/0008181 A1* | 1/2007 | Rollert | G06Q 10/02 340/932.2 |
| 2007/0125838 A1* | 6/2007 | Law | G06Q 20/04 235/379 |
| 2007/0145135 A1* | 6/2007 | Jogand-Coulomb | G06K 7/10237 235/451 |
| 2007/0197261 A1* | 8/2007 | Humbel | G06Q 30/00 455/558 |
| 2007/0223595 A1* | 9/2007 | Hannuksela | H04N 19/0043 375/240.26 |
| 2008/0067249 A1* | 3/2008 | Nakatsugawa | G06Q 20/32 235/451 |
| 2008/0079547 A1 | 4/2008 | Alicot et al. | |
| 2008/0095234 A1* | 4/2008 | Wang | H04N 19/187 375/240.13 |
| 2008/0127345 A1* | 5/2008 | Holtmanns | H04L 12/585 726/23 |
| 2008/0181228 A1* | 7/2008 | Hannuksela | H04N 21/234327 370/394 |
| 2009/0147803 A1* | 6/2009 | Takayama | G06K 7/0008 370/475 |
| 2010/0082481 A1* | 4/2010 | Lin | G06Q 20/042 705/41 |
| 2010/0217723 A1 | 8/2010 | Sauerwein et al. | |
| 2010/0227553 A1* | 9/2010 | Charrat | G06Q 20/341 455/41.1 |
| 2011/0174874 A1* | 7/2011 | Poznansky | G06K 19/12 235/379 |
| 2012/0099136 A1* | 4/2012 | Ueda | G06Q 20/346 358/1.14 |
| 2012/0205437 A1 | 8/2012 | Sauerwein et al. | |
| 2013/0117078 A1* | 5/2013 | Weik, III | G06Q 10/00 705/13 |
| 2014/0254470 A1* | 9/2014 | Wendling | H04L 69/08 370/315 |

\* cited by examiner

F I G . 6
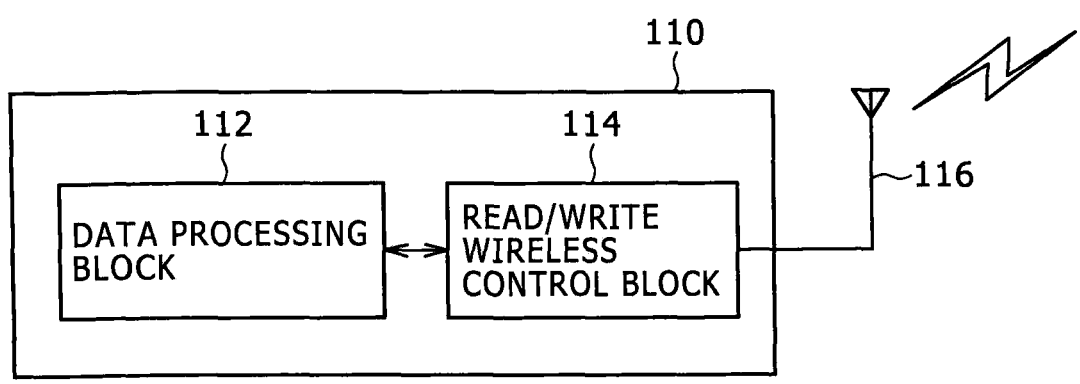

DATA COMMUNICATIONS SYSTEM, INFORMATION PROCESSING TERMINAL, IC CARD, READER/WRITER, AND PROGRAM

CROSS REFERENCES TO RELATED APPLICATIONS

This application is a continuation of U.S. patent application Ser. No. 13/012,334, filed on Jan. 24, 2011 (now allowed), which is a continuation of application Ser. No. 11/756,506, filed May 31, 2007 (now U.S. Pat. No. 7,891,544), which claims the benefit of priority of Japanese Patent Application JP 2006-155007, filed in the Japan Patent Office on Jun. 2, 2006. The entire disclosures of the above-referenced applications are expressly incorporated herein by reference.

BACKGROUND OF THE INVENTION

1. Field of the Invention

The present invention relates to a data communications system, an information processing terminal, an IC (Integrated Circuit) card, a reader/writer, and a program that are capable of wireless communication in a non-contact manner.

2. Description of the Related Art

Recently, information processing terminals, such as IC tags and IC cards capable of wireless communication in a non-contact manner and mobile phones having these IC cards, have been gaining popularity. These IC tags are used as embedded in price tags of commercial products for electronic reading the prices thereof, for example. IC cards are used to record electronic money information or the like for the application to the payment of purchased goods, for example. Attaching such an IC card function to information processing terminals in the form of an IC chip allows the inquiry for the balances of electronic money in each IC card through the information processing terminal, thereby expanding the application thereof.

In updating the information held in an information processing terminal attached with the IC card function described above, the user owning the information processing terminal first holds the IC card attached to the information processing terminal over a reader/writer that is continuously outputting a signal carrier. Then, the IC card, having detected the signal carrier being outputted from the reader/writer, establishes wireless communication with the reader/writer, thereby updating the data held in the information processing terminal as directed by a command issued from the reader/writer. The processing mainly based on such a reader/writer allows the user to complete update processing without executing a special operation.

In the data communication between the above-mentioned information processing terminal and reader/writer, the wireless control block of the IC card is typically in a command wait state; when the wireless control block receives data from the reader/writer, the wireless control block holds the received data and then enters the command wait state again. When the wireless control block receives a data transfer request from the controller of the information processing terminal, the wireless control block transmits the requested data held therein to the controller of the information processing terminal (refer to Japanese Patent No. 3617509 for example).

However, the above-mentioned communications processing supports only the unidirectional data transmission and reception request for the IC card and therefore disables the IC card to issue commands to the reader/writer.

The reader/writer is able to recognize the presence of each IC card only after receiving a response to a command (especially, a polling command) issued by the reader/writer. Therefore, in order to capture the IC card, the reader/writer has to continuously transmit a polling command at predetermined time intervals. If there are a plurality of IC cards within a communicable range of the reader/writer, namely, if a plurality of IC cards are held over the reader/writer in a stacked manner, for example, there may occur a collision between the responses from these IC cards to the polling command, thereby requiring some measures for the prevention of the collision.

SUMMARY OF THE INVENTION

In addition to the information processing terminal provided with the above-mentioned IC card function, an information processing terminal provided with a reader/writer function has bee proposed, which is considered to increase chances of data communication between information processing terminals. However, the above-mentioned related-art technologies in which data transmission is only in one direction present a problem that data may not be transmitted from a mate information processing terminal, for example. Therefore, it is desirable to provide a data communications system in which, while one information processing terminal transmits a signal carrier and a mate information processing terminal is receiving the transmitted signal carrier, this mate information processing terminal is also able to transmit data to the signal carrier transmitting terminal.

Further, with the above-mentioned related-art data communications system, the IC card is typically in a command wait state, so that, even if the IC card is ready for data transfer, data transfer may not be started, thereby taking fairly long before completing data transfer. This delay would become an obstacle to the reduction of processing time of future data communications systems that will be versatile and complicated in application and demanded to execute instantaneous processing operations.

Therefore, the present invention addresses the above-identified and other problems associated with related-art methods and apparatuses and solves the addressed problems by providing a data communications system, an information processing terminal, an IC card, a reader/writer, and a computer program that are novel and improved.

In a data communications system based on a reader/writer functioning as an initiator outputting a signal carrier, an IC card functioning as a target in which the signal carrier is entered, and an information processing terminal for executing data communication with the reader/writer via the IC card, the IC card proactively access the reader/writer to shortly establish a data transfer status in which data is transferred with the reader/writer or a continuous communications status in which data can be continuously transmitted or received.

In carrying out the invention and according to one embodiment, there is provided a data communications system configured to execute data communication between three parties of a reader/writer, an IC card wirelessly communicable with the reader/writer in a non-contact manner, and an information processing terminal connected to the intergraded circuit card via a wired interface. This data communications system is made up of the reader/writer having a read/write wireless control block configured to output a signal carrier and control wireless communication with the IC card; the IC card having an IC card wireless control block configured to start and control wireless communication with the reader/writer in accordance with detection of the signal carrier outputted from the read/write wireless control block; and the information processing terminal having a request acceptance block configured to accept a data transfer request from a user; a data storage block configured to store data; and a data transmission block, connected to the IC wireless control block via a wired interface, configured to transmit a data transfer request signal and data in the data storage block to the IC wireless control block in response to a data transfer request from the request acceptance block; wherein, upon reception of a data transfer request signal and data from the data transmission block, the IC wireless control block switches a communication mode of the IC wireless control block to a continuous communication mode in which data can be continuously transmitted or received and transmits the data transfer request signal and the data to the read/write wireless control block without waiting for a command from the read/write wireless control block; and the read/write wireless control block switches the communication mode to the continuous communication mode by use of the data transfer request signal from the IC wireless control block as a trigger and receives the data from the IC wireless control block. The above-mentioned command includes a polling command for recognizing an IC card that is communicable with the own reader/writer, a pull command for transmitting data to the own reader/writer, and a push command for transmitting data of the own reader/writer to an IC card.

With the data communications system practiced as one embodiment of the invention, (1) the IC card can proactively access the reader/writer and (2) the IC card can voluntarily access the reader/writer without receiving a command, a polling command, for example, from the reader/writer, so that the reader/writer need not continuously output polling commands.

The advantage (1) above allows the transmission of desired data to the reader/writer whenever a user desired through the request acceptance block of the information processing terminal. If no command is received from the reader/writer, the IC card can proactively issue a communication start request signal to establish a continuous communication status with the reader/writer. In addition, because the IC wireless control block transmits a data transfer request signal and data at the same time, the data can be transferred in a relatively short time without waiting for a response indicative whether the reader/writer is ready for data transfer.

The advantage (2) above allows eliminates the collision between responses to a polling command if there are two or more information processing terminals within a communication range with the reader/writer, thereby eliminating the necessity for the provision of a collision avoiding mechanism.

In carrying out the invention and according to another embodiment, there is provided an information processing terminal connectable with an IC card by a wired interface. This information processing terminal is made up of a request acceptance block configured to accept a data transfer request from a user; a data storage block configured to store data; and a data transmission block configured to transmit a data transmission request signal and data stored in the data storage to the IC card via the wired interface in response to the data transfer request from said request acceptance block.

The above-mentioned novel configuration allows the user to transmit desired data to the reader/writer whenever the user desires via the IC card.

The above-mentioned data transmission block receives a data transfer request from the above-mentioned request acceptance block and, after synchronization with the IC card, transmits the data transfer request signal and data stored in the above-mentioned data storage to the IC card.

In a status where only a signal carrier from the reader/writer is detected and none of polling, pull, and push commands is received, the IC wireless control block of the IC card and the data transmission block of the information processing terminal are not synchronized with each other. The synchronization between the IC wireless control block and the data transmission block that is necessary for the data transfer from the information processing terminal is executed proactively by the information processing terminal rather than by the reader/writer, leading to a significantly shortened time for data transfer processing.

A computer program is also provided that is configured to make an information processing terminal operate, the information processing terminal being connectable with an IC card via a wired interface and having a request acceptance block for accepting a data transfer request from a user and a data storage for storing data. This computer program makes the information processing terminal transmit a data transfer request signal and data stored in the data storage to the IC card via the wired interface in response to the data transfer request from the request acceptance block.

In carrying out the invention and according to still another embodiment, there is provided an IC card wirelessly communicable with a reader/writer in a noncontact manner and connectable with an information processing terminal via a wired interface. This IC card has an IC wireless control block configured to start and control wireless communication with the reader/writer in response to detection of a signal carrier outputted from the reader/writer and, upon reception of a data transfer request signal and data from the information processing terminal, switch a communication mode of the IC card to a continuous communication mode in which data can be continuously transmitted or received, thereby transmitting the data transfer request signal and the data to the reader/writer without waiting for a command from the reader/writer.

The above-mentioned novel configuration allows the user to transmit desired data to the reader/writer whenever the user desired and, at the same time, allows the IC card to proactively establish a continuous communication status with the reader/writer without receiving a command from the reader/writer.

The above-mentioned IC card may also have a status display block configured to display that data is being transmitted from the IC wireless control block to the reader/writer. This status display block can also display a data transfer error, if any.

The above-mentioned status display block is formed by a visible display device. Through this status display block, the user can check data read/write operations. For example, in an attempt for data transfer, when the user holds IC card over the reader/writer and data transfer starts, the LED of the status display block goes on; when the data transfer has been completed, the LED goes off. If the data transfer has failed by some reason, the LED blinks, telling the user that the data transfer has not been completed.

The above-mentioned IC card may receive an electromagnetic wave energy from the reader/writer to operate on the received electromagnetic eave energy. If the IC card is formed integrally with the information processing terminal, the IC card may receive the energy from that information processing terminal.

The above-mentioned novel configuration eliminates the necessity for arranging a limited power supply on the IC card, thereby forming the IC card with low cost and compact size. The IC card without power supply is normally in a power save standby status (or so-called sleep status) and therefore starts an operation when the power is accumulated enough by the access from the reader/writer.

A computer program is also provided that is configured to operate an IC card wireless communicable with a reader/writer in a noncontact manner and connectable with an information processing terminal via a wired interface. This computer program makes the IC card start and control wireless communication with the reader/writer in accordance with detection of a signal carrier outputted from the reader/writer and, upon reception of a data transfer request signal and data from the information processing terminal, switch a communication mode of the IC card to a continuous communication mode in which data can be continuously transmitted or received, thereby transmitting the data transfer request signal and the data to the reader/writer without waiting for a command from the reader/writer.

In carrying out the invention and according to yet another embodiment, there is provided a reader/writer communicable with an IC card in a noncontact manner. This reader/writer has a read/write wireless control block configured to output a signal carrier to control wireless communication with the IC card and switch a communication mode of the read/write wireless control block to a continuous communication mode in which data can be continuously transmitted or received by use of a data transfer request signal as a trigger, thereby receiving data at substantially the same time as the data transfer request signal from the information processing terminal.

The above-mentioned novel configuration allows the reception of data transmitted from the IC card at the time when the user desires and allows the establishment of a continuous communication status with the IC card upon data transfer request from the IC card without transmission of a command, such as a polling command, from the reader/writer. In addition, data is received from the IC card at substantially the same time as the data transfer request signal, resulting in a significantly shortened time requisite for data reception.

Further, a computer program is provided that is configured to operate a reader/writer wirelessly communicable with an IC card in a noncontact manner. This computer program makes the reader/writer output a signal carrier to control wireless communication with the IC card and switch a communication mode of the reader/writer to a continuous communication mode in which data can be continuously transmitted or received by use of a data transfer request signal outputted from the information processing terminal as a trigger, thereby receiving data transmitted from the information processing terminal at substantially the same time as the data transfer request signal from the information processing terminal.

The above-mentioned IC card may be formed integrally with the information processing terminal to which the IC card is connected in a wired manner. In addition, the IC card and the reader/writer may be integrated into one unit having both the functions. In this case, the communications control block, for example, that is duplicate in function, may be arranged for each of the functions of the IC card and the reader/writer or only one duplicate unit may be arranged to be shared by other components of the system.

As described and according to the invention, an IC card proactively accesses a reader/writer to transfer data from an information processing terminal to the reader/writer through simple processing, thereby preferably executing data communication between the reader/writer and the information processing terminal.

BRIEF DESCRIPTION OF THE DRAWINGS

FIG. 6 is a functional block diagram illustrating an exemplary approximate configuration of a reader/writer;

DETAILED DESCRIPTION OF THE PREFERRED EMBODIMENTS

Figure 1:
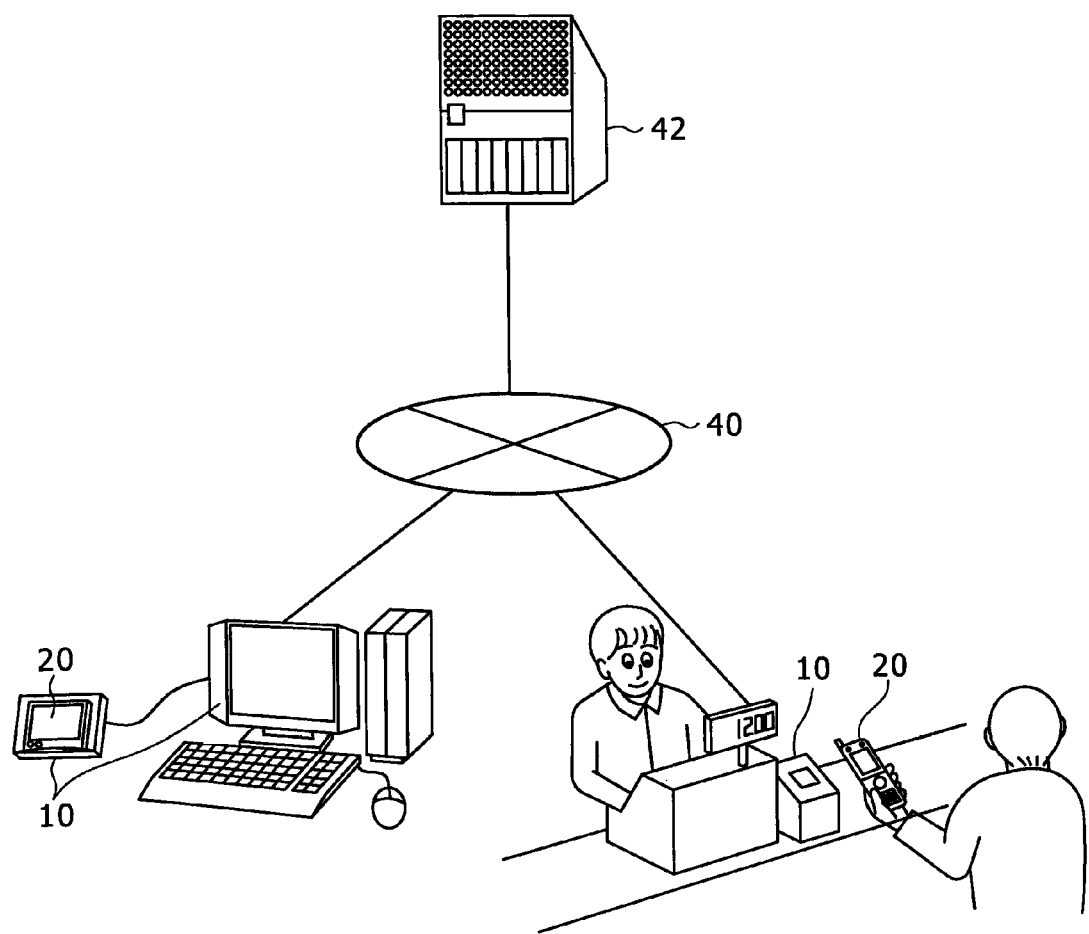
FIG. 1 is schematic diagram illustrating a data communications system practiced as one embodiment of the invention.

This invention will be described in further detail by way of embodiments thereof with reference to the accompanying drawings. It should be noted that, throughout the description herein and the drawings accompanying hereto, components having substantially the same functional configuration are denoted by the same reference numeral, thereby skipping the duplicate description.

(Data Communications System)

Now, referring to FIG. 1, there is shown a schematic diagram illustrating a data communications system practiced as one embodiment of the present invention. This data communications system is made up of a reader/writer 10 configured to output a wireless communications signal carrier and a portable user terminal 20 that is configured to receive the signal carrier.

The user terminal 20 is based on a mobile phone, a PDA (Personal Digital Assistant), a personal computer, or a mobile computer, for example, in which an IC card and an information processing terminal practiced as embodiments of the invention are integrally formed. Therefore, the user terminal 20 be described below has both functions of the IC card and the information processing terminal. Herein, the description is made with the IC card and the information processing terminal integrally formed, but the present invention is not limited to this configuration; for example, the IC card and the information processing terminal may be formed separately to be wired to each other at use, for example.

The IC card included in the user terminal 20 has an IC chip having the IC card function. This IC chip may be configured integrally by an RF analog front end and a logic circuit in a single chip for implementing the IC card function or configured by these components in a separate chips in accordance with the embodiment of the invention. The IC card and the information processing terminal may be integrally formed by incorporating the IC chip as the IC card into the user terminal or by connecting the separately formed IC card of SIM card type to the user terminal.

The reader/writer 10 of the above-mentioned data communications system may be connected with a server 42 that provides applications to the reader/writer 10 via a communications network 40. These applications may define a data exchange procedure to be executed between the reader/writer 10 and the IC card in the user terminal 20.

For the above-mentioned data communications system, the NFC (Near Field Communication) standard based on an RF carrier frequency of 13.56 MHz may be applied. In the communication based on the NFC standard, communication is executed in a range as small as about 10 cm in radius in a non-contact and anti-tamper manner. Therefore, the user can visually and easily check and recognize a reader/writer that is the target of communication, thereby preventing information leakage. Also, this communication allows easy-to-understand communications processing, such as the data transfer by hand action, for example.

In the above-mentioned data communications system, the user can hold the user terminal 20 of his own over the reader/writer 10 to get various services provided by the reader/writer 10. Normally, in order to execute communication with the user terminal 20, the reader/writer 10 constantly outputs a signal carrier that is standardized in the above-mentioned data communications system.

When the user brings the IC card of the user terminal 20 into a range of about 10 cm for example of the reader/writer 10, the IC card of the user terminal 20 detects the signal carrier to establishes a communication path, getting in a command wait state. Having recognized the reader/writer 10 by issuing a polling command, the reader/writer 10 reads data from the user terminal 20 or writes data from the reader/writer 10 to the user terminal 20. The following describes the reader/writer 10 and the user terminal 20 in detail.

Figure 2:
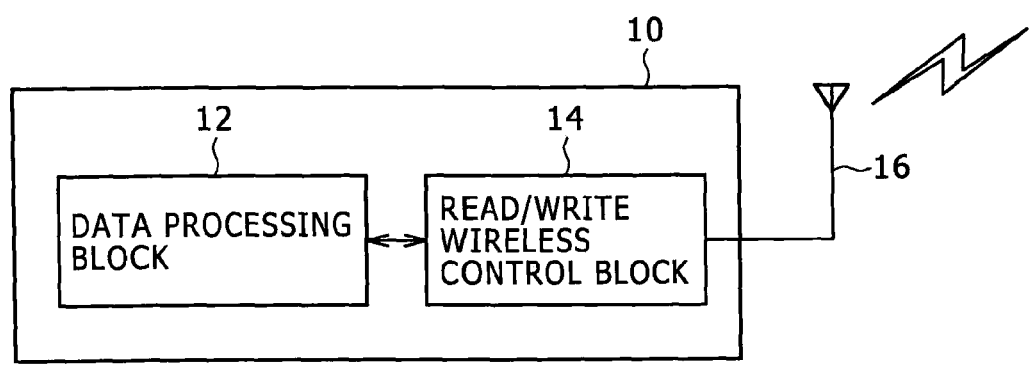
FIG. 2 is a functional block diagram illustrating an exemplary approximate configuration of a reader/writer.

Referring to FIG. 2, there is shown a functional block diagram illustrating an exemplary approximate configuration of the reader/writer 10. The reader/writer 10 is made up of a data processing block 12, a read/write wireless control block 14 configured to output a-signal carrier in response to a request for outputting the signal carrier from the data processing block 12 to control the wireless communication with the user terminal 20, and a read/write antenna block 16.

Figure 3:
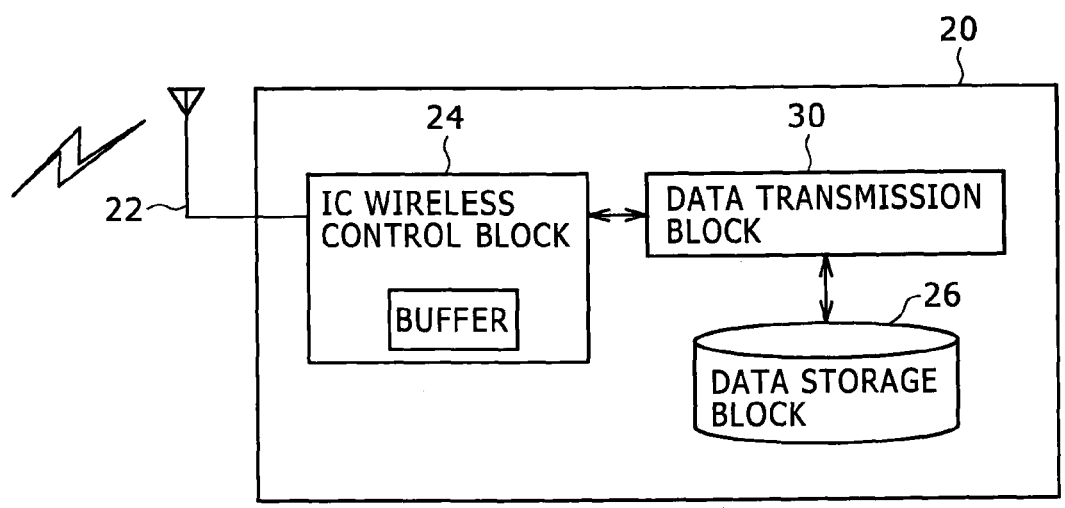
FIG. 3 is a functional block diagram illustrating an exemplary approximate configuration of an information processing terminal.

Referring to FIG. 3, there is shown a functional block diagram illustrating an exemplary approximate configuration of the user terminal 20. The user terminal 20 is made up of an IC antenna block 22 an IC wireless control block 24 configured to start and control the wireless communication with the reader/writer 10 upon detection of the signal carrier from the reader/writer 10 and have a buffer for buffering the received data, a data storage block 26 configured to store data obtained by the user terminal 20, and a data transmission block 30 configured to write data received from the reader/writer 10 to the data storage block 26 upon request from the reader/writer 10 and transmit data from the data storage block 26 to the reader/writer 10 via the IC wireless control block 24. Here, the IC antenna block 22 and the IC wireless control block 24 function as the IC card, while the data storage block 26 and the data transmission block 30 function as the information processing terminal.

(Data Transmission and Reception)

The following describes the processing of data transmission and reception between the reader/writer 10 and the user terminal 20 in detail.

Referring to FIG. 4, there is shown the processing of establishing the communication path between the reader/writer 10 and the user terminal 20. Between the data processing block 12 and the read/write wireless control block 14 and between the IC wireless control block 24 and the data transmission block 30 of the user terminal 20, wireless interfaces are formed. Between the read/write wireless control block 14 of the reader/writer 10 and the IC wireless control block 24 of the user terminal 20, a wireless interface is formed.

Each ellipse shown in FIG. 4 is indicative of a synchronous status of each component. If an ellipse extends over two or more components, it indicates that these components are all in synchronization. "Synchronization" as used herein denotes a status in which tasks including clock synchronization are shared, in which components executing different tasks come to execute a same task.

Figure 4A:
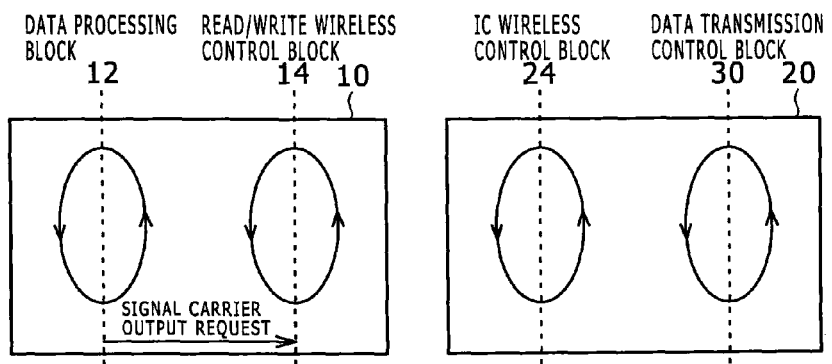
FIGS. 4A, 4B, 4C, and 4D are diagrams illustrating the establishment of communications paths between the reader/writer and the information processing terminal.
Figure 4B:
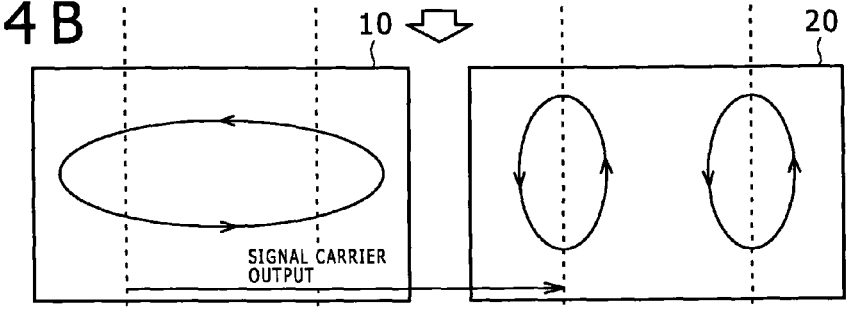

As shown in FIG. 4A that is before the start of communication, the data processing block 12, the read/write wireless control block 14, the IC wireless control block 24, and the data transmission block 30 are operating independently of each other or asynchronously. Then, when the data processing block 12 outputs a signal carrier output request to the read/write wireless control block 14, the read/write wireless control block 14 accordingly synchronizes with the data processing block 12, outputting the signal carrier as shown in FIG. 4B.

Figure 4C:
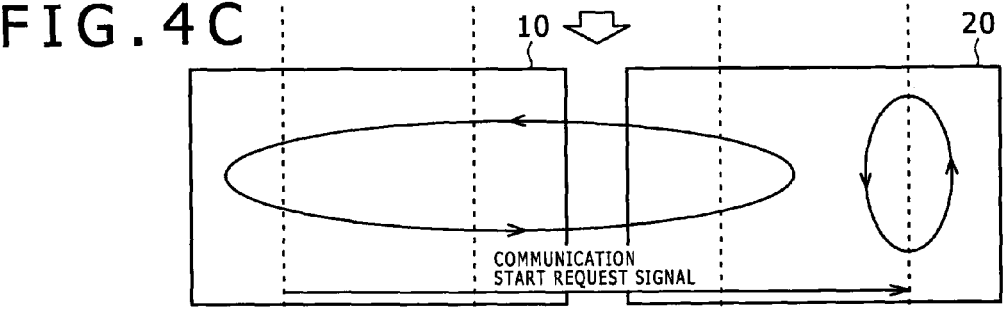
Figure 4D:
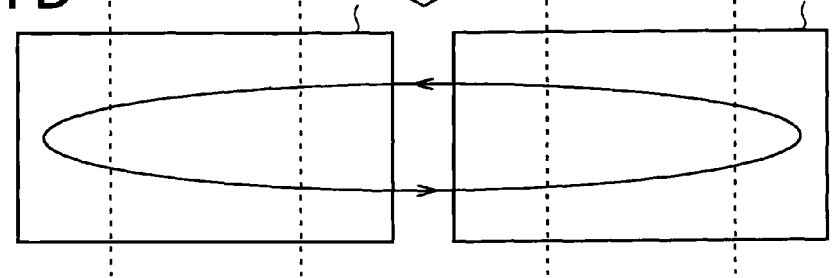

When the user terminal 20 gets in the receivable range in which the signal carrier outputted from the reader/writer 10 can be received, the IC wireless control block 24 synchronizes with the data processing block 12 and the read/write wireless control block 14 in accordance with the detection of the signal carrier as shown in FIG. 4C. At this moment, the IC wireless control block 24 enters a state in which to wait for a command from the reader/writer 10. When the reader/writer 10 transmits a communication start request signal to the user terminal 20, the IC wireless control block 24 of the user terminal 20 receives this communication start request signal to cause an interrupt of communication start request onto the data transmission block 30, thereby synchronizing with the data transmission block 30. Thus, the data processing block 12, the read/write wireless control block 14, the IC wireless control block 24, and the data transmission block 30 are all put in synchronization as shown in FIG. 4D, thereby enabling the transmission and reception of data.

Figure 5:
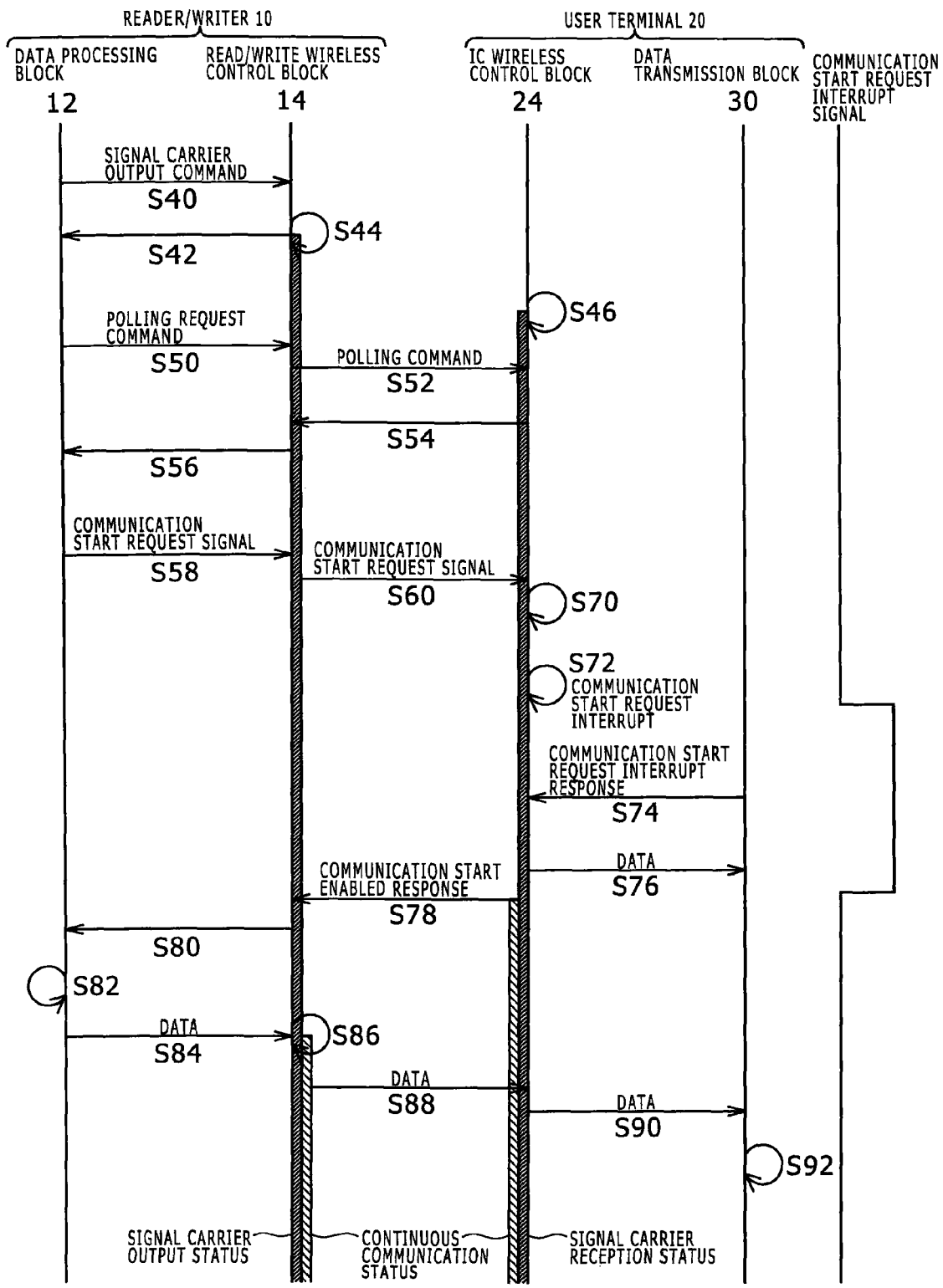
FIG. 5 is a sequence chart specifically indicative of a method of data communication between the reader/writer and the information processing terminal.

Referring to FIG. 5, there is shown a sequence chart specifically indicative of a method of data communication between the reader/writer 10 and the user terminal 20. Especially, shown here is a case in which data is transmitted from the reader/writer 10 to the user terminal 20. The following describes a detail procedure of the data communication with reference to FIG. 5.

When communication starts on the reader/writer 10, the data processing block 12 outputs a signal carrier output command (Turn On RF Power) to the read/write wireless control block 14 (S40). The read/write wireless control block 14 then returns a response indicative of the reception of this command to the data processing block 12 (S42). At the same time, the read/write wireless control block 14 starts outputting the signal carrier (S44). If the user terminal 20 is inside a near range in which the wireless communication with the reader/writer 10 is enabled, the IC wireless control block 24 moves to a signal carrier reception status (S46). Then, the user becomes communicable with the reader/writer 10, in which the user terminal 20 only moves to a command wait status and returns no response. Therefore, the reader/writer 10 may not recognize the presence of the user terminal 20.

Receiving the response from the read/write wireless control block 14, the data processing block 12 of the reader/writer 10 transmits a polling request command to the read/write wireless control block 14 (S50) and the read/write wireless control block 14 outputs a polling command in response (S52). Such a polling command is used to check whether unspecified user terminals 20 are inside communicable ranges and whether there is any processing request, such as data transmission. The reader/writer 10 issues such a polling command and recognizes the presence of the user terminal 20 or the presence of a processing request by receiving the response to the polling command. The IC wireless control block 24 of the user terminal 20 returns a response to the polling command (S54) and the read/write wireless control block 14 of the reader/writer 10 notifies the data processing block 12 of the return from the user terminal 20 (S56). Receiving the return of response to the polling command, the reader/writer 10 can recognize the presence of the user terminal 20 for the first time.

Having recognized the user terminal 20 by means of the polling command, if there is any data to be transmitted to the user terminal 20, the reader/writer 10 transmits a communication start request signal including a push command for continuously transmitting data and part of the data to be transmitted (the propose ad-hoc mode) to the read/write wireless control block 14 (S58). The read/write wireless control block 14 outputs received communication start request signal and data as radio waves (S60).

The IC wireless control block 24 of the user terminal 20 receives the communication start request signal and the data from the reader/writer 10 and holds the received data into the buffer arranged on the IC wireless control block 24 (S70), causing an interrupt of communication start request onto the data transmission block 30 (S72). This interrupt causes the communication start request interrupt signal in the user terminal 20 into an active status.

Having recognized the communication start request interrupt signal, the data transmission block 30, when ready for starting the communication, transmits, to the IC wireless control block 24, a reception request command (the start ad-hoc mode) including a pull command for continuous reception of data to the IC wireless control block 24 as a response to the communication start request interrupt of the IC wireless control block 24 (S74). Then, the IC wireless control block 24 transfers the data received from the reader/writer 10 and held in the buffer to the data transmission block 30 (S76) and, at the same time, returns a communication start enabled response for the communication start request signal to the reader/writer 10 (S78). Here, the user terminal 20 gets in the continuous communication status (the ad-hoc mode) in which data can be continuously transmitted or received, upon which the communication start request interrupt signal shifts to an inactive status. Here, the continuous communication status may allow the bidirectional transmission and reception of data as described above or the unidirectional transmission in which, only when one party continuously transmits data, the other can continuously receive data.

Having received the communication start enabled response, the read/write wireless control block 14 of the reader/writer 10 notifies the data processing block 12 thereof (S80). The data processing block 12 recognizes that the user terminal 20 is ready for communication and then gets in the continuous transmission of the data held in the reader/writer 10 (S82). Next, the data processing block 12 transmits the data to be transmitted next to the read/write wireless control block 14 (S84). Here, the reader/writer 10 also finally gets in the continuous communication status (the ad-hoc mode) (S86), becoming ready for transmitting the data from the reader/writer 10 to the user terminal 20. The read/write wireless control block 14 transmits the data to the user terminal 20 (S88).

Receiving the above-mentioned data, the IC wireless control block 24 of the user terminal 20 transmits the received data to the data transmission block 30 (S90). The data transmission block 30 sequentially stores the data thus obtained into the data storage block 26 (S92). Here, no response to the data reception is returned to the reader/writer 10; returning or not returning the response may be selected by the user. If the amount of data to be transmitted is large, the data is divided into appropriate amounts and the divided data are transmitted by repeating the above-mentioned processing of S84 and on. Finally, a data transfer end command (the terminate ad-hoc mode) is transmitted from the read/write wireless control block 14 (not shown), upon which the transmission of all data is completed.

On the other hand, when the reader/writer 10 receives data from the user terminal 20, the processing operations shown in FIG. 5 (S50 through S82) are executed and the data transmission executed in step S84 and on is replaced by the transmission of a data transfer request signal. Having received the data transfer request signal, the data-transmission block 30 transmits the data stored in the data storage block 26 to the data processing block 12 via the IC wireless control block 24 and the read/write wireless control block 14. Thus, the reader/writer 10 can receive the data from the user terminal 20.

The above-mentioned communication between the reader/writer 10 and the user terminal 20 in the above-mentioned data communications system is practiced by causing the user terminal 20 to respond the a polling command received from the reader/writer 10 for the recognition of the user terminal 20 and causing the IC card of the user terminal 20 to operate in accordance with commands to be issued from the reader/writer 10. Every time one task ends, the IC card returns to a status in which to wait for a command from the reader/writer 10 or the information processing terminal.

With the above-mentioned data communications system, the start of data transmission and reception is triggered by a unidirectional communication start request signal from the reader/writer 10. However, this configuration disables the user terminal 20 to voluntarily start accessing the reader/writer 10 ready for the reception of commands (or ready for getting in a command wait status).

With related-art data communications systems, it is not assumed that the reader/writer 10 that outputs a signal carrier only execute superior control on the IC card. Therefore, the IC card can only wait for commands from the reader/writer 10 if there is data to be transmitted to the reader/writer 10 and the data communication is ready at detection of the signal carrier from the reader/writer 10.

On the other hand, the reader/writer 10 may not recognize the detection of a signal carrier by the IC card; therefore, the reader/writer 10 outputs a polling command and recognizes the status of the IC card by recognizing the presence of the IC card by the response to the polling command. Only when the reader/writer 10 confirms the status of the IC card, the reader/writer 10 knows that there is data in the IC card, starting the transfer of the data. Consequently, it takes very long until the data transfer gets started.

Recently, chances have been increasing that data communication is executed between the user terminals having both functions of reader/writer and IC card. In this case, if the transmission of data is unidirectional, the data transmission from the other party is disabled. Therefore, a data communications system is desired in which, while a signal carrier is being transmitted from one user terminal and the other user terminal is receiving that signal carrier, the other user terminal can also transmit data at the same time.

In addition, it is necessary for the above-mentioned reader/writer 10 to continuously transmit a polling command at predetermined time intervals so as to capture the IC card. If a plurality of IC cards exists within the communicable range of the reader/writer 10, namely, if a plurality of stacked IC cards is held over the reader/writer, the responses from these IC cards may collide one another for the polling command transmitted from the reader/writer 10. Therefore, there should be some mechanism for avoiding the collision.

The embodiment of the present invention (1) allows the IC card of the user terminal to voluntarily access the reader/writer without waiting for a command from the reader/writer, thereby significantly shortening the processing time required for data transfer and (2) allows the IC card to voluntarily access the reader/writer without receiving a command, a polling command for example, from the reader/writer, thereby eliminating the necessity for the reader/writer to continuously output a polling command, which in turn eliminates the necessity for arranging a response collision avoiding mechanism. The following describes a data communications system practiced as one embodiment of the invention.

(Data Communications System Practiced as One Embodiment of the Invention)

The data communications system practiced as one embodiment of the present invention is made up of a reader/writer 110 and a user terminal 120 having substantially the same functions as the reader/writer 10 and the user terminal 20 shown in FIG. 1, respectively. Like the user terminal 20, the user terminal 120 is a terminal integrally made up of an IC card and an information processing terminal according to the embodiment of the invention. The reader/writer 110 and the user terminal 120 are different from the reader/writer 10 and the user terminal 20 in the points that are described below in detail. The following describes each of the components of the reader/writer 110 and the user terminal 120.

Referring to FIG. 6, there is shown a functional block diagram illustrating an exemplary approximate configuration of the reader/writer 110. As shown, the reader/writer 110 is made up of a data processing block 112, a read/write wireless control block 114, and a read/write antenna block 116.

The data processing block 112 manages and controls the entire reader/writer 110 by means of a semiconductor integrated circuitry including a central processing unit (CPU). Especially, the data processing block 112 processes the data for use in the reader/writer 110. In addition, the data processing block 112 transmits data held in the data processing block 112 to the user terminal 120 through the read/write wireless control block 114 that will be described later and receives data from the user terminal 120 to process the received data. When the data processing block 112 is powered on, the data processing block 112 first requests the read/write wireless control block 114 for outputting a signal carrier so as to start wireless communication with the user terminal 120.

The read/write wireless control block 114, connected with the data processing block 112 through a wired interface, outputs a signal carrier in response to a signal carrier output request supplied from the data processing block 112 and controls the wireless communication with the user terminal 120 that detects the signal carrier. If the read/write wireless control block 114 receives a data transfer request signal and data from an IC wireless control block 124 of the user terminal 120, the read/write wireless control block 114 switches the communication mode to the continuous communication status by use of this data transfer request signal as a trigger to receive the data from the IC wireless control block 124 to the data processing block 112.

The above-mentioned read/write antenna block 116, an antenna for use in communication with the user terminal 120, converts an electrical signal from the reader/writer 110 into a wireless radio signal and a wireless radio signal from the user terminal 120 into an electrical signal. The length and shape of this antenna may be formed in accordance with RF carrier frequency 13.56 MHz in NFC, for example.

Figure 7:
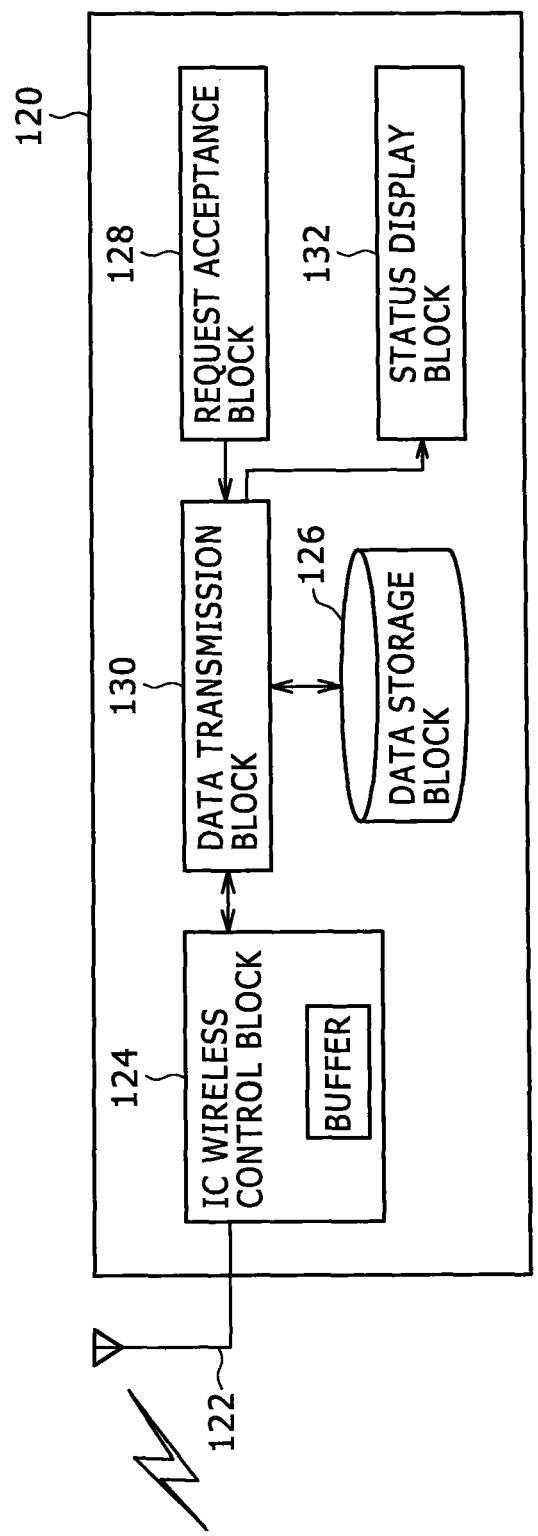
FIG. 7 is a functional block diagram illustrating an exemplary approximate configuration of an information processing terminal.

Referring to FIG. 7, there is shown a functional block diagram illustrating an exemplary approximate configuration of the user terminal 120. This user terminal 120 is made up of an IC antenna block 122, an IC wireless control block 124, a data storage block 126, a request acceptance block 128, a data transmission block 130, and a status display block 132. The IC antenna block 122 and the IC wireless control block 124 function as the IC card and the data storage block 126, request acceptance block 128 and the data transmission block 130 function as the information processing terminal, the status display block 132 being shared between the IC card and the information processing terminal.

The above-mentioned user terminal 120 may be implemented by a communications device, such as a mobile phone or a PDA, for example. Alternatively, the user terminal 120 may be formed into a thin card. The IC card of the user terminal 120 may be powered by the electromagnetic force from the reader/writer 110. The battery-less user terminal 120 that is thus powered by the reader/writer 110 is normally in a power save standby status (or so-called sleep status) and therefore starts an operation when the power is accumulated enough by the access from the reader/writer 110.

The above-mentioned IC antenna block 122, an antenna for use in communication with the user terminal 110, converts an electrical signal from the reader/writer 120 into a wireless radio signal and a wireless radio signal from the user terminal 110 into an electrical signal. The length and shape of this antenna may be formed in accordance with RF carrier frequency 13.56 MHz in NFC, for example.

Detecting the signal carrier from the read/write wireless control block 114 of the reader/writer 110, the IC wireless control block 124 starts wireless communication with the reader/writer 110, thereby controlling data exchange through the communication to be executed later. Receiving a data transfer request signal and data from the data transmission block 130 to be described later, the IC wireless control block 124 switches the communication mode to the continuous communications status, in which the IC wireless control block 124 can transmit the received data transfer request signal and data to the read/write wireless control block 114 of the reader/writer 110 by load modulation with the same timing without waiting for a command, such as a polling command, a pull command, or push command, for example, from the read/write wireless control block 114. This transmission of the same timing denotes the transmission of the data transfer request signal and the data at substantially the same time without waiting for a response from the reader/writer 110, strictly the same time being not required.

The above-mentioned signal carrier is used to allocate a communications path between the reader/writer 110 and the IC card of the user terminal 120. At the time when the wireless communication based on the signal carrier, the reader/writer 110 may not recognize the user terminal 120, in which no data transmission/reception is executed. By use of the above-mentioned polling command, for example, the reader/writer 110 starts data communication with the user terminal 120.

The data storage block 126 is formed by a RAM, an EEPROM, a nonvolatile RAM, a flash memory, a card memory, a USB memory, or a HDD (Hard Disk Drive), for example, storing data including user ID, money amount information, settlement information, and application information, for example, to be stored in the user terminal 120.

The above-mentioned request acceptance block 128 is configured to accept user-desired processing by an interface, such as a switch of pressure, tactile, or thermo-sensitive type or another interface connected to the user terminal 120 or integrally formed therewith. In the present embodiment, user data transfer requests are accepted, especially. It is also practicable to arrange two or more request acceptance blocks 128 on the user terminal 120, which allows the user to select data to be exchanged with the reader/writer 110.

In addition, the request acceptance block 128 can also share an existing input block and the function thereof in the user terminal 120. For example, if the user terminal 120 in the present embodiment is a mobile phone, the mobile phone has an input button group through which the user enter phone numbers and mail texts, for example, so that one or more of these buttons may be used as the request acceptance block 128 of the present embodiment.

The above-mentioned data transmission block 130, connected to the IC wireless control block 124 by a wired interface, transmits a data transfer request signal and data stored in the data storage block 126 to the IC wireless control block 124 in accordance with a data transfer request from the request acceptance block 128.

The above-mentioned status display block 132, formed by a LED (Light Emitting Diode), a LCD (Liquid Crystal Display), or an EL (Electro-Luminescence) device, for example, visually or audibly tells the user a status of data at the time of reading or writing data. For example, if the status display block 132 is based on a LED, the user can know the status of data by the color or the lighting condition (off, blinking, or on); if the status display block 132 is based on an LCD, the user can know the status of data by the color of background or text comments, for example. While data is being transmitted from the IC wireless control block 124 to the reader/writer 110, displaying this state allows the user to understand the read/write status of the data in the user terminal 120.

For example, in an attempt for data transfer, when the user holds the user terminal 120 over the reader/writer 110 and operates the request acceptance block 128, the LED of the status display block 132 goes on; when the data transfer to the user terminal 120 has been completed, the LED goes off. If the data transfer has failed by some reason, the LED blinks, telling the user that the data transfer has not been completed.

(Specific Circuit Configurations of Reader/Writer 110 and the User Terminal 120)

The following describes the specific circuit configurations of the reader/writer 110 and the user terminal 120.

Figure 8:
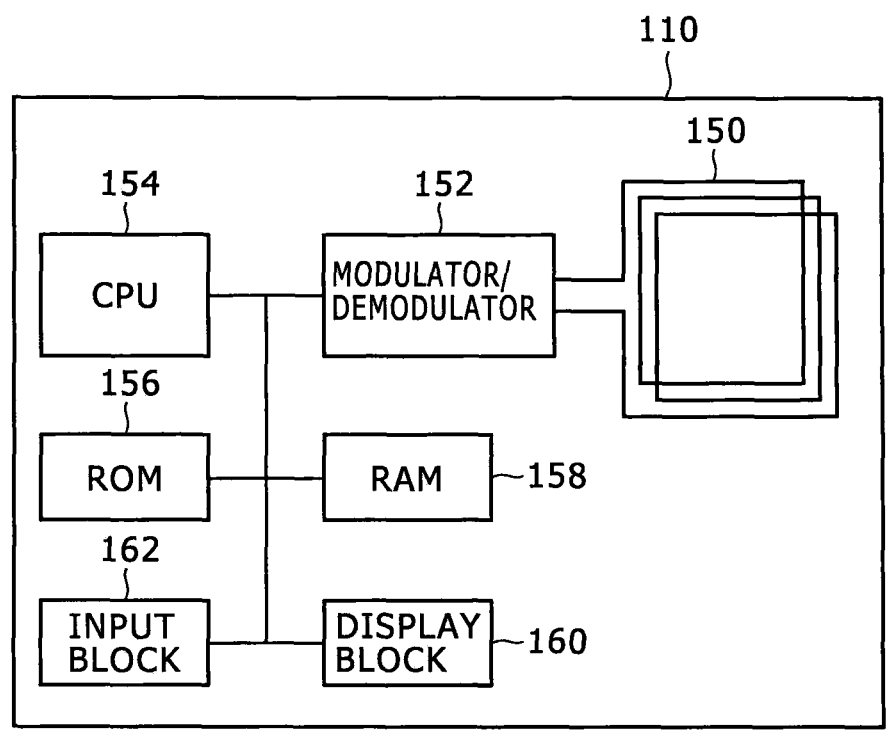
FIG. 8 is a circuit block diagram illustrating an exemplary approximate configuration of the reader/writer shown in FIG. 6.

Referring to FIG. 8, there is shown a circuit block diagram illustrating an exemplary approximate configuration of the reader/writer 110 according to the embodiment of the invention. As shown, the reader/writer 110 is made up of a loop antenna 150, a modulator/demodulator 152, a CPU 154, a ROM 156, a RAM 158, a display block 160, and an input block 162.

The loop antenna 150 is an antenna with reception sensitivity enhanced by forming a plurality of loops even in a narrow space. Thus, the communication band of the above-mentioned data communications system is assured. Also, depending on a communications standard to be used or the frequency of a signal carrier to be used, the antenna of the IC chip may be used instead of this loop antenna 150.

The modulator/demodulator 152 modulates the data to be transmitted to the user terminal 120 in accordance with the standard of the data communications system and demodulates a modulated radio wave from the user terminal 120. The modulator/demodulator 152 may be formed by an RF circuit, an encoder, and a decoder, for example.

The CPU 154 is a semiconductor integrated circuit configured to execute signal processing and manages and controls the entire reader/writer 110. The ROM 156, connected to the CPU 154 via bus, stores programs in advance that is read by the CPU 154 so as to control the reader/writer 110. The RAM 158 temporarily stores predetermined data and stores variables, for example, that are used by the CPU 154 for executing the function of the reader/writer 110. The CPU 154 reads programs from the ROM 156 to execute the functions of the data processing block 112 and the read/write wireless control block 114.

The display block 160 is formed by a monochrome or color display device and displays applications to be processed on the reader/writer 110. If the reader/writer 110 is connected to the server 42, then the display block 160 can display the GUI (Graphical User Interface) of applications to be provided from the server 42 to the reader/writer 110 as well as a Web browser. The input block 162 is formed by a key input block, not shown, such as alphabetical and numeric keys and supports the display function of the display block 160 and allows the user to select services.

Figure 9:
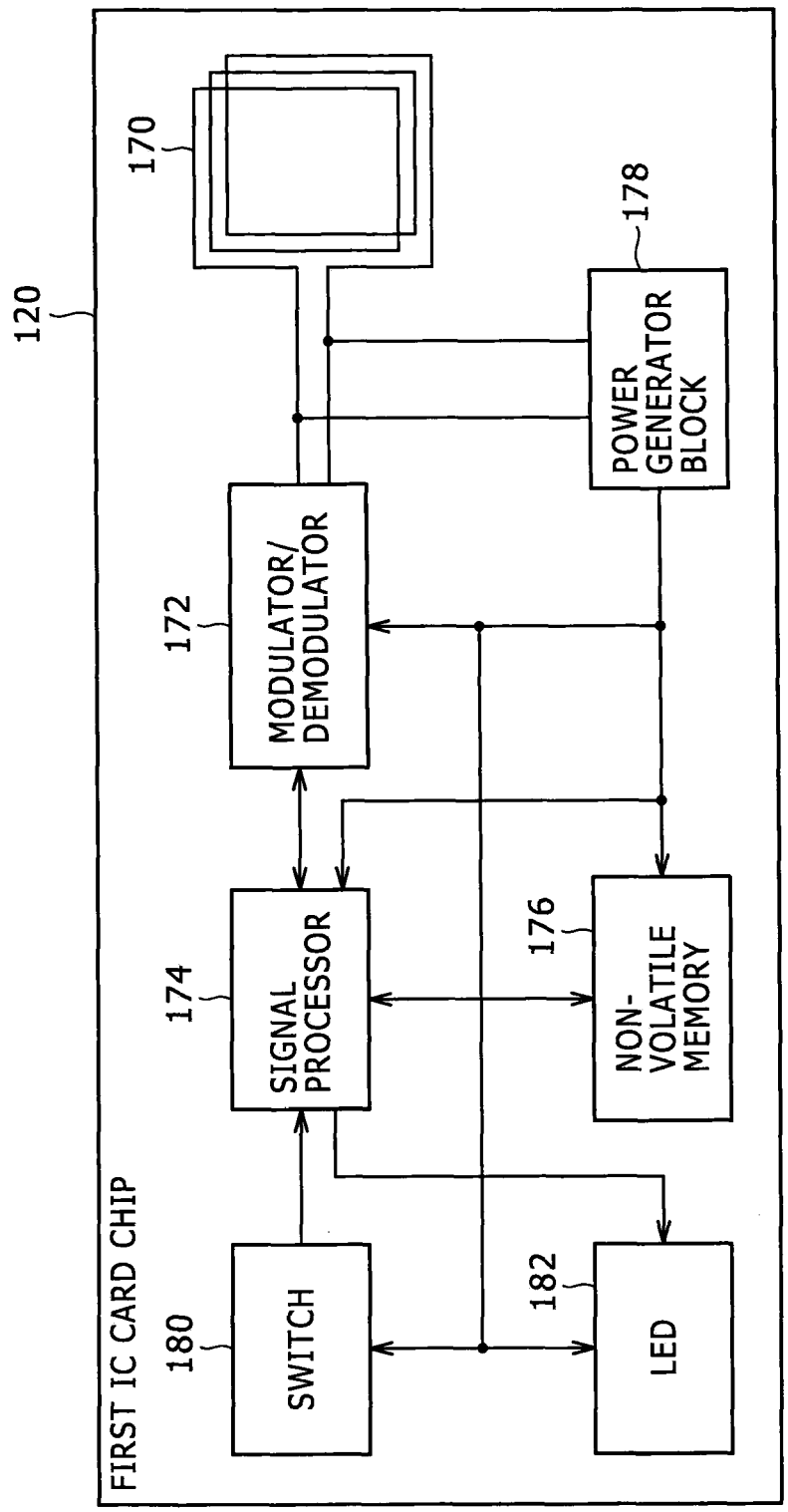
FIG. 9 is a circuit block diagram illustrating an exemplary approximate configuration of an IC card as the information processing terminal shown in FIG. 7.

Referring to FIG. 9, there is shown a circuit block diagram illustrating an exemplary approximate configuration of especially the IC card of the user terminal 120 according to the present embodiment. The IC card is made up of a loop antenna 170, a modulator/demodulator 172, a signal processor 174, a nonvolatile memory 176, a power generator 178, a switch 180, and a LED 182.

Like the loop antenna 150 of the reader/writer 110, the loop antenna 170 is an antenna formed by a plurality of loops. Also, depending on a communications standard to be used or the frequency of a signal carrier to be used, the antenna of the IC chip may be used instead of this loop antenna 170.

The modulator/demodulator 172 modulates the data to be transmitted to the reader/writer 110 in accordance with the standard of the data communications system and demodulates the modulated radio wave from the reader/writer 110. The data transmission to the reader/writer 110 is based on load switching, to be specific. In this load switching, the terminal-to-terminal load of the coil of the loop antenna 170 is varied according to the data to be returned to the reader/writer 110 to transfer data to the reader/writer 110 through the impedance variation between the antenna terminals as viewed from the reader/writer 110. Therefore, a signal carrier is outputted from the reader/writer 110, but not from the user terminal 120.

The above-mentioned signal processor 174 is a semiconductor integrated circuit that executes signal processing and manages and controls the entire IC card. The nonvolatile memory 176 has both the functions of ROM and RAM and stores data in a nonvolatile manner, that is, the stored data will not be erased when the nonvolatile memory 176 is powered off. Therefore, if the data is rewritten by the IC card manager and then the IC card is powered off, the data still remains in the memory. The signal processor 174 thus configured reads a program from the nonvolatile memory 176 to function as the IC wireless control block 124 and the data transmission block 130, the nonvolatile memory 176 functioning as the data storage block 126.

The power generator 178 converts the radio wave from the reader/writer 110 into electrical power while the reader/writer 110 is connected to the user terminal 120 and supplies the obtained electrical power to the modulator/demodulator 172, the signal processor 174, the nonvolatile memory 176, the switch 180, and the LED 182. Thus, the power generator 178 has to supply power to each circuit from the limited radio wave, so that each circuit has to be formed by a device that uses as small power as possible.

The above-mentioned switch 180 converts the physical pressure given from outside the IC card into an electrical signal and transmits the obtained electrical signal to the signal processor 174. The switch 180 functions as the request acceptance block 128.

The LED 182 turns on/off or blinks in accordance with a signal given from the signal processor 174. The LED 182 functions as the status display block 132.

(Data Transmission and Reception)

The following describes in detail the processing operations of the data transmission and reception between the reader/writer 110 and the user terminal 120.

Referring to FIG. 10, there are shown diagrams illustrating the establishment of communications paths between the reader/writer 110 and the user terminal 120. Between the data processing block 112 of the reader/writer 110 and the read/write wireless control block 114 and between the IC wireless control block 124 of the user terminal 120 and the data transmission block 130, wired interfaces are formed. Between the read/write wireless control block 114 of the reader/writer 110 and the IC wireless control block 124 of the user terminal 120, a wireless interface is formed.

Each ellipse shown in FIG. 10 is indicative of the synchronization state of each component as with each ellipse shown in FIG. 4. If an ellipse extends over two or more components, it indicates that these components are all in synchronization.

Figure 10A:
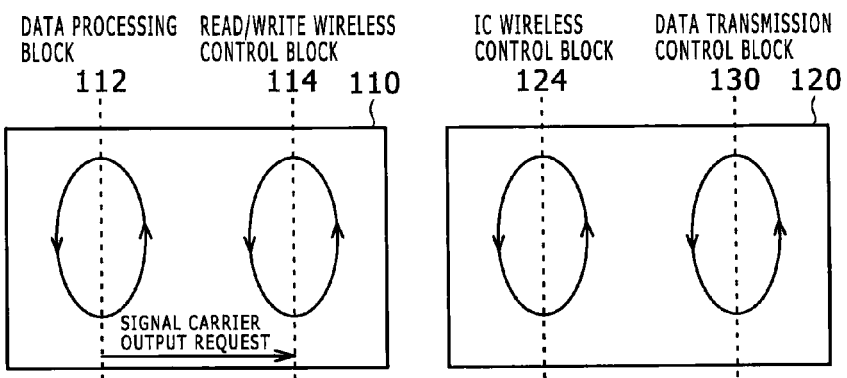
FIGS. 10A, 10B, 10C and 10D are diagrams illustrating the establishment of communication paths between the reader/writer and the information processing terminal.
Figure 10B:
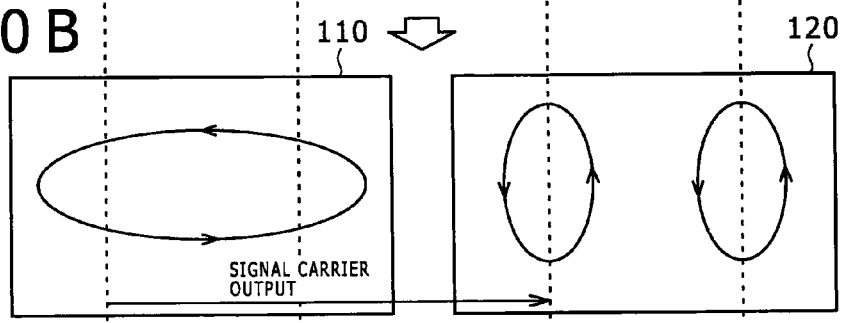

As shown in FIG. 10A that is before the start of communication, the data processing block 112, the read/write wireless control block 114, the IC wireless control block 124, and the data transmission block 130 are operating independently of each other or asynchronously. Then, when the data processing block 112 outputs a signal carrier output request to the read/write wireless control block 114, the read/write wireless control block 114 accordingly synchronizes with the data processing block 112, outputting the signal carrier as shown in FIG. 10B.

Figure 10C:
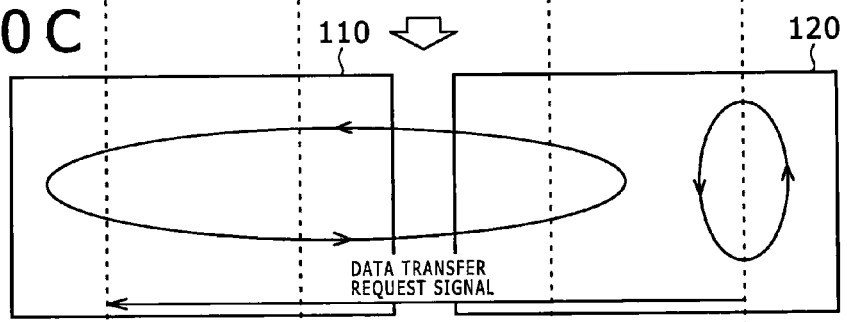

When the user terminal 120 gets in the receivable range in which the signal carrier outputted from the reader/writer 110 can be received, the IC wireless control block 124 synchronizes with the data processing block 112 and the read/write wireless control block 114 in accordance with the detection of the signal carrier as shown in FIG. 10C. At this moment, the IC wireless control block 124 enters a state in which to wait for a command from the reader/writer 110. Unless the IC wireless control block 124 receives a communication start request signal from the reader/writer 110, the IC wireless control block 124 and the data transmission block 130 remain asynchronous with each other.

Figure 10D:
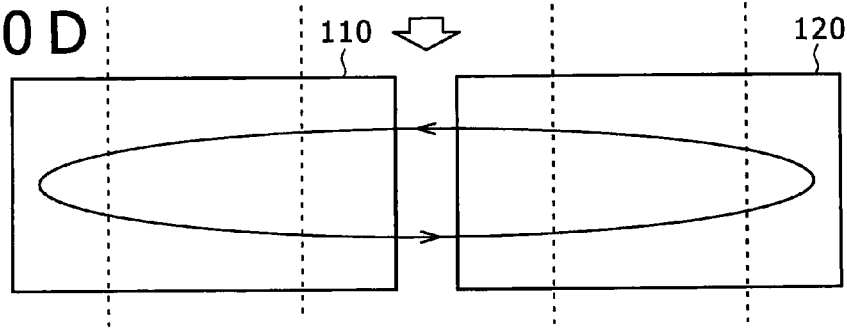

If the user makes a data transfer request through the request acceptance block 128, the data transmission block 130 proactively synchronizes with the IC wireless control block 124. Thus, if the IC wireless control block 124 receives no command from the reader/writer 110, synchronization can be obtained in all of the data processing block 112, the read/write wireless control block 114, the IC wireless control block 124, and the data transmission block 130 as shown in FIG. 10D, thereby causing a status ready for the transmission and reception of data.

Figure 11:
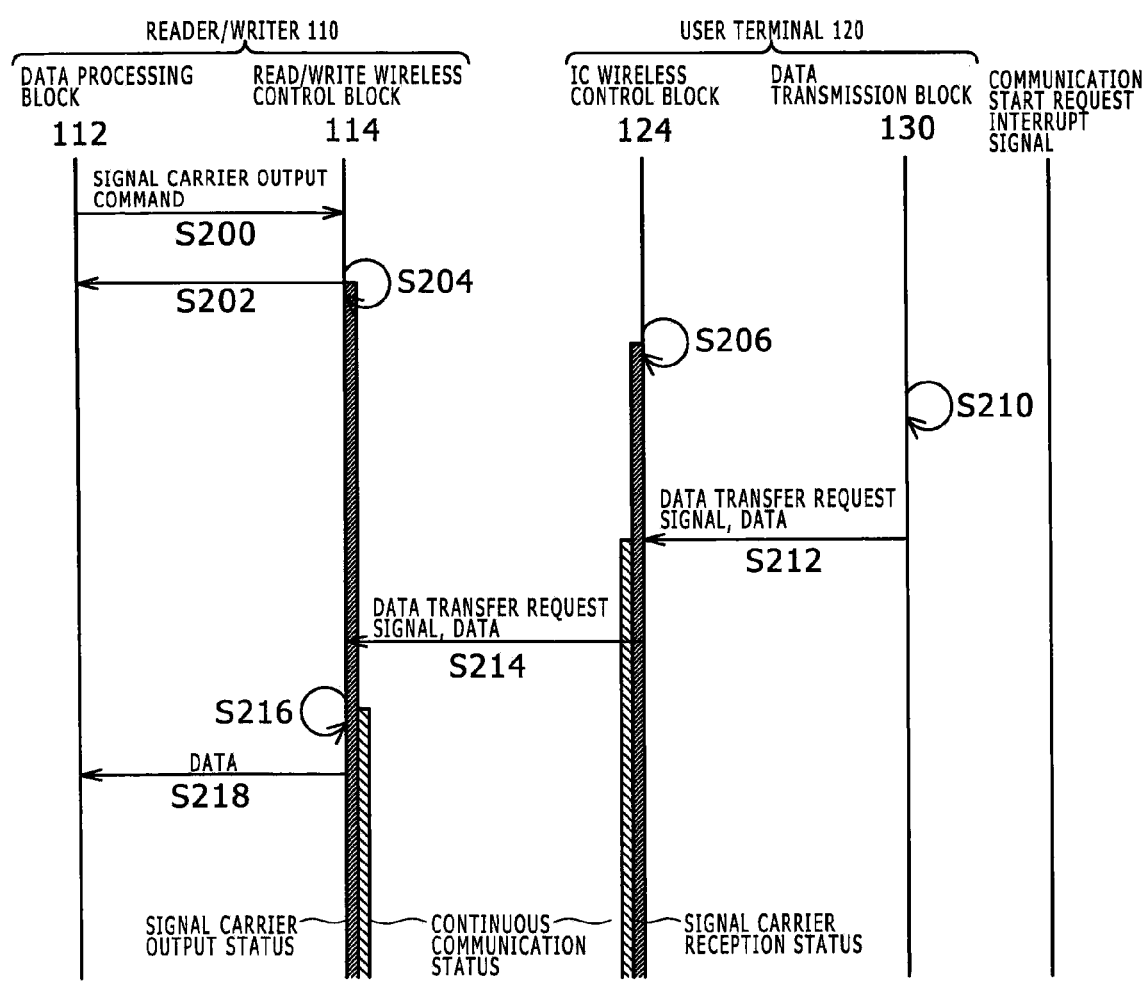
FIG. 11 is a sequence chart specifically indicative of a method of data communication between the reader/writer and the information processing terminal.

Referring to FIG. 11, there is shown a sequence chart indicative of the data communication between the reader/writer 110 and the user terminal 120. Especially, this chart is indicative of the transmission of data proactively by the user terminal 120 to the reader/writer 110. The following describes in detail this data communication with reference to FIG. 11.

When communication starts with the reader/writer 110, the data processing block 112 outputs a signal carrier output command (the turn on RF power) to the read/write wireless control block 114 (S200) and the read/write wireless control block 114 notifies the data processing block 112 of the reception of this command (S202). At the same time, the read/write wireless control block 114 starts outputting a signal carrier (S204). Here, if the user terminal 120 is within a range wirelessly communicable with the reader/writer 110, the IC wireless control block 124 shifts to the signal carrier reception status (S206). Namely, the IC wireless control block 124 gets in a status in which the IC wireless control block 124 is synchronized with the data processing block 112 and the read/write wireless control block 114. The user terminal 120 recognizes that the user terminal 120 is ready for data communication with the reader/writer 110, getting in a status in which to wait for a command from the reader/writer 110 and in which the user terminal 120 is ready for accessing the reader/writer 110.

If the IC wireless control block 124 receives a communication start request-signal from the read/write wireless control block 114 in the status in which the data processing block 112, the read/write wireless control block 114, and the IC wireless control block 124 are synchronized, the transmission and reception of data is started in a processing procedure as shown in FIG. 5. However, in the present embodiment, a communication start request can be proactively outputted from the user terminal 120 without receiving such a communication start request signal.

First, the user operates the request acceptance block 128 to select data to be transmitted and gives a data transfer request to the user terminal 120 (S210). Receiving the data transfer request, the data transmission block 130 synchronizes with the IC wireless control block 124 to transmit a data transfer request signal for notifying the IC wireless control block 124 of the data transfer and the data stored in the data storage block 126 to the IC wireless control block 124 (S212).

Thus, as described above, the data processing block 112, the read/write wireless control block 114, the IC wireless control block 124, and the data transmission block 130 are all synchronized with each other. At this moment, a communication start request interrupt signal in the user terminal 120 remains unchanged.

Then, receiving the data transfer request signal and data from the data transmission block 130, the IC wireless control block 124 shifts to the continuous communication status (the ad-hoc mode), thereby transmitting these data transfer request signal and data to the read/write wireless control block 114 of the reader/writer 110 at the same time without waiting for a command, such as a data transfer command (S214).

Having received the data transfer request signal from the IC wireless control block 124 of the user terminal 120, the read/write wireless control block 114 of the reader/writer 110 recognizes that the data will be successively transmitted later and switches the communication mode to the continuous communications status by use of this data transfer request signal as a trigger (S216). Thus, the reader/writer 110 also gets in the continuous communications status (the ad-hoc mode). The read/write wireless control block 114 successively receives the data from the IC wireless control block 124 and transmits the received data to the data processing block 112 (S218).

If the amount of data to be transmitted from the user terminal 120 is large, the data is divided into appropriate amounts and the divided data are transmitted by repeating the above-mentioned processing of S212 and on.

On the other hand, when the reader/writer 110 proactively receives data from the user terminal 120, the processing operations shown in FIG. 11 (S200 through S210) are executed and the transmission of the data transfer request signal and the data executed in step S212 and on is replaced by the transmission of a data reception request signal. Having received the data reception request signal, the data processing block 112 transmits the data stored in the data storage block 110 to the data transmission block 130 via the read/write wireless control block 114 and the IC wireless control block 124. Thus, the user terminal 120 can receive the data from the reader/writer 110.

In the embodiment described above, in addition to the recognition of the user terminal 120 by the reader/writer 110 by responding to a polling command, the reader/writer 110 is recognized by the detection of a signal carrier by the user terminal 120. Therefore, the reader/writer 110 is enabled for data transfer from the time at which a response is made to a polling command and the user terminal 120 is enabled for data transfer from the time at which a signal carrier is detected.

Also, because the user terminal 120 can proactively access the reader/writer 110 without waiting for a command from the reader/writer 110, the reader/writer 110 need not continuously output polling commands. Therefore, the reader/writer 110 and the user terminal 120 can start communication whenever desired. Namely, the party that demands data communication may only start data communication whenever desired, which enhances the degree of freedom in communication processing. This novel configuration also eliminates the power consumption otherwise necessary for the continuous output of polling commands, thereby achieving power saving.

Further, because the reader/writer 110 need not continuously output polling commands, if there are two or more user terminals 120 in the range communicable with the reader/writer 110, the simultaneous reception of two or more responses to polling commands need not be executed, thereby preventing a problem to be caused by the collision of responses.

Still further, without waiting for a command from the reader/writer 110, the IC wireless control block 124 can transmit a data transfer request signal and data at the same time, thereby significantly shortening the time requisite for data transfer.

(Communication Between User Terminals)

In the above-mentioned embodiment, it is assumed that a user terminal having an IC card access a stationary reader/writer; however, the present embodiment is not limited to such a configuration. For example, any of the following configurations are practicable.

Figure 12:
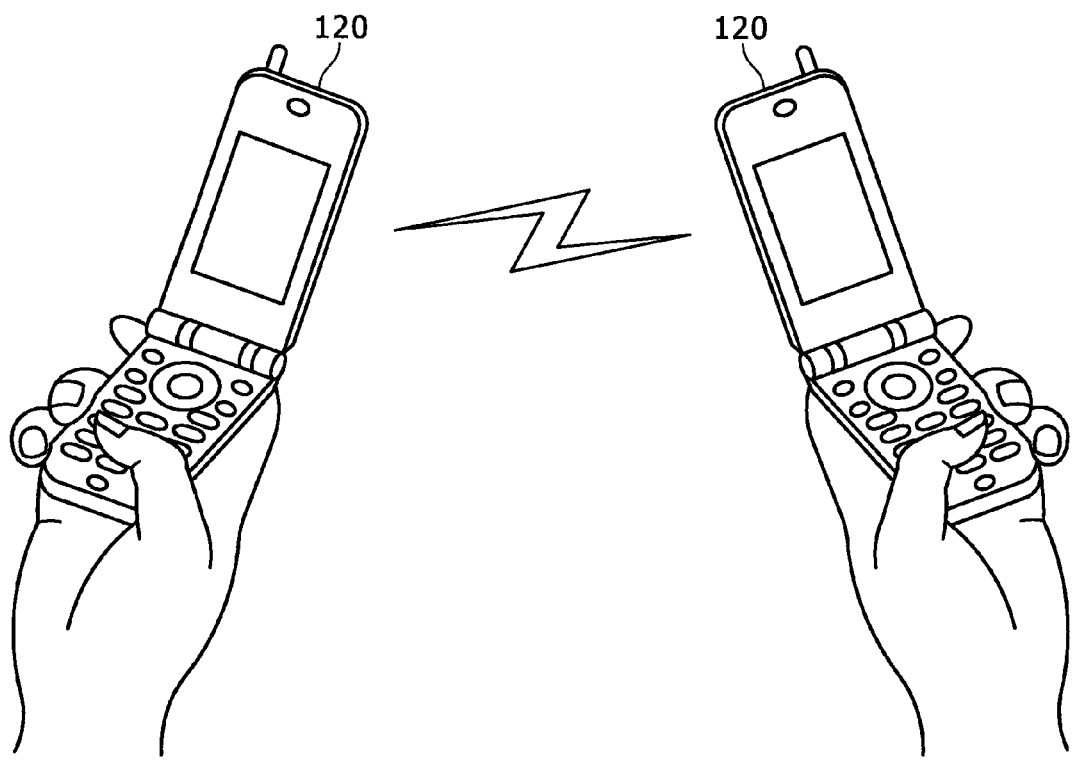
FIG. 12 is a schematic diagram illustrating another example of a data communications system shown in FIG. 1.

Referring to FIG. 12, there is shown another example of the data communications system of the present embodiment. As shown, the two user terminals 120 each have all functions of the reader/writer 110, the IC card, and the information terminal. Therefore, each user terminal 120 is able to transmit and receive signal carriers.

For example, if one user terminal 120 transmits a signal carrier by use of the function of the reader/writer 110, then the other user terminal 120 detects the signal carrier by use of the function of the IC card, thereby becoming the receiving party of the signal carrier. In related-art technologies, only the data communication from the transmitting user terminal 120 to the receiving user terminal 120 is permitted. The present embodiments also permit the data communication in the reverse direction.

To be more specific, in data transmission from one user terminal 120 that transmits a signal carrier to the other user terminal 120, data transmission is started by recognizing the mate of communication by a polling command as with related-art technologies; in transmitting data from the other user terminal 120 that receives the signal carrier, data transmission is started by a data transfer request signal based on the IC card according to the present embodiment. Thus, only the detection of a signal carrier allows any parties outputting and receiving signal carriers to access the other party.

The above-mentioned novel configuration allows the transfer of data, such as address books and photographs, for example, between the user terminals 120 regardless which party is outputting a signal carrier.

(Computer Programs)

A computer program is also provided. This computer program is used to operate the IC card of the user terminal 120 and the information processing terminal. To be more specific, this computer program makes the user terminal 120 start and control the wireless communication with the reader/writer 110 upon detection of a signal carrier outputted from the reader/writer 110, thereby transmitting a data transfer request signal and the data held in the user terminal 120 to the reader/writer 110 at the same time in response to a data transfer request by the user.

In addition, another computer program is provided. This computer program is used to operate the reader/writer 110. To be more specific, this computer program makes the reader/writer 110 output a signal carrier to control the wireless communication with the user terminal 120, switch the communication mode to the continuous communication status by use of a data transfer request signal from the user terminal 120 as a trigger, and receive the data transfer request signal and the data from the user terminal 120 at the same time.

While preferred embodiments of the present invention have been described using specific terms, such description is for illustrative purpose only, and it is to be understood that changes and variations may be made without departing from the spirit or scope of the following claims.

It should be noted herein that the steps for describing each program recorded in recording media include not only the processing operations which are sequentially executed in a time-dependent manner but also the processing operations which are executed concurrently or discretely (for example, parallel processing or object processing).

What is claimed is:

1. An information processing apparatus connectable with an integrated circuit chip by a wired interface, the integrated circuit chip configured to receive an input and data sent from an external reader/writer device via near field communication and to store the received data, the information processing apparatus comprising:
    circuitry configured to:
        initiate a transmission, via the wired interface to the integrated circuit chip and in response to the received input, of a data transmission request signal, including a pull command, for beginning an ad-hoc mode for continuous communication;
        receive, via the wired interface from the integrated circuit chip and in response to the transmitted data transmission request signal, the received data that has been stored in the integrated circuit chip;
        initiate a storage of the received data into a non-transitory medium; and
        terminate the ad-hoc mode, in response to a data transfer end command sent from the external reader/writer device via near field communication without waiting for any predetermined command.

2. The information processing apparatus according to claim 1, wherein the circuitry synchronizes with the integrated circuit chip after the integrated circuit chip receives the input from the external reader/writer device, and receives the data transmission request signal and the data from the integrated circuit chip in the ad-hoc mode.

3. The information processing apparatus according to claim 1, wherein the integrated circuit chip is configured to be wirelessly communicable with the external reader/writer device in a noncontact manner.

4. The information processing apparatus according to claim 3, further comprising:
    a display unit configured to display whether data is being transmitted from the integrated circuit chip to the external reader/writer device,
    wherein the display unit is implemented via at least one processor.

5. The information processing apparatus according to claim 3, wherein electromagnetic wave energy is received from the external reader/writer device and the integrated circuit chip uses the received electromagnetic wave energy.

6. The information processing apparatus according to claim 1, wherein additional data is transmitted from the external reader/writer device to the integrated circuit chip in the ad-hoc mode, prior to termination of the ad-hoc mode.

7. The information processing apparatus according to claim 1, wherein the circuitry is further configured to initiate the transmission, via the wired interface to the integrated circuit chip and in response to the received input, of the data transmission request signal, including the pull command, for beginning the ad-hoc mode for continuous communication without waiting for any predetermined command.

8. An information processing method comprising the following operations performed by one or more processors:
    receiving, via near field communication, an input and data sent from an external reader/writer device and storing the received data into an integrated circuit chip;
    in response to the received input, transmitting to the integrated circuit chip, via a wired interface, a data transmission request signal, including a pull command, for beginning an ad-hoc mode for continuous communication;
    in response to the transmitted data transmission request signal, receiving from the integrated circuit chip, via the wired interface, the received data that has been stored in the integrated circuit chip;
    storing the received data into a non-transitory medium; and
    terminating the ad-hoc mode, in response to a data transfer end command sent from the external reader/writer device via near field communication without waiting for any predetermined command.

9. The information processing method according to claim 8, wherein additional data is transmitted from the external reader/writer device to the integrated circuit chip in the ad-hoc mode, prior to termination of the ad-hoc mode.

10. A non-transitory computer-readable storage medium storing instructions which, when executed by one or more processors, cause the one or more processors to:
    receiving, via near field communication, an input and data sent from an external reader/writer device and storing the received data into an integrated circuit chip;
    in response to the received input, initiate a transmission to the integrated circuit chip, via a wired interface, of a data transmission request signal, including a pull command, for beginning an ad-hoc mode for continuous communication;
    terminating the ad-hoc mode, in response to a data transfer end command sent from the external reader/writer device via near field communication without waiting for any predetermined command.

11. The non-transitory computer-readable storage medium according to claim 10, wherein additional data is transmitted from the external reader/writer device to the integrated circuit chip in the ad-hoc mode, prior to termination of the ad-hoc mode.

\* \* \* \* \*